United States Patent
Mesic, Jr.

(10) Patent No.: US 10,322,671 B1
(45) Date of Patent: Jun. 18, 2019

(54) SYSTEM AND APPLICATION FOR AUDITORY GUIDANCE AND SIGNALING

(71) Applicant: GM GLOBAL TECHNOLOGY OPERATIONS LLC, Detroit, MI (US)

(72) Inventor: Ronald J. Mesic, Jr., Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/969,406

(22) Filed: May 2, 2018

(51) Int. Cl.
    *G08G 1/005*     (2006.01)
    *B60Q 9/00*     (2006.01)
    (Continued)

(52) U.S. Cl.
    CPC ............... *B60Q 9/00* (2013.01); *G08B 7/066* (2013.01); *G06Q 90/205* (2013.01)

(58) Field of Classification Search
    CPC .... H03H 7/40; H03H 1/00; H03H 2001/0057; H02J 50/12; H02J 7/025; H02J 50/70; H02J 50/60; H02J 50/90; H02J 5/005; H02J 50/80; H02J 50/50; H02J 17/00; H02J 50/40; H02J 7/0047; H02J 2007/26; H02J 50/05; H02J 7/35; H02J 7/0027; H02J 7/0029; B60L 11/82; B60L 11/1842; B60L 11/184; B60L 11/1844; B60L 1/1846; B60L 2210/30; B60L 2240/527; B60L 2240/529; B60L 2240/662; B60L 2240/72; B60L 3/003; B60L 3/0069; B60L 3/04; B60L 11/1838; B60L 2210/40; B60L 2200/12; B60L 2250/16; B60L 11/1848; B60L 2210/10; B60L 2230/22; B60L 2250/10; B60L 11/1833; B60L 2210/20; B60L 2200/22; B60L 2230/24; B60L 2260/28; B60L 11/1829; B60L 11/1824; B60L 11/1812; B60L 2200/36; B60L 11/1831;
    (Continued)

(56) References Cited

U.S. PATENT DOCUMENTS 5,253,216 A * 10/1993 Haisfield ................. G01S 7/537
    367/1
6,243,476 B1 * 6/2001 Gardner .................. H04S 1/007
    381/1

(Continued)

FOREIGN PATENT DOCUMENTS

WO      2009045649 A1      4/2009

*Primary Examiner* — Daniel Previl
(74) *Attorney, Agent, or Firm* — Lorenz & Kopf LLP (57) ABSTRACT

In various embodiments, methods, systems, and mobile platforms are provided for providing auditory guidance. In certain exemplary embodiments, a method includes receiving information pertaining to a guidance task to provide auditory guidance proximate a location or target for a platform; selecting, via a processor, a plurality of transducers proximate the location or target, the plurality of transducers including: a first transducer disposed on a first side of the location or target; and a second transducer disposed on a second side of the location or target, opposite the first side; and controlling, via the processor, the plurality of transducers to provide auditory signals, such that the first transducer and the second transducer produce respective auditory signals that are phase cancelled with respect to one another, to thereby provide the auditory guidance to the location or target.

17 Claims, 7 Drawing Sheets

(51) Int. Cl.
*G08B 7/06* (2006.01)
*G06Q 90/00* (2006.01)

(58) Field of Classification Search
CPC .............. B60L 2270/32; B60L 11/185; B60L 2200/18; B60L 2200/40; B60L 2200/42; B60L 2230/14; B60L 2230/16; B60L 2230/30; B60L 2230/32; B60L 2240/36; B60L 2240/525; B60L 2260/46; Y02T 10/7005; Y02T 90/122; Y02T 90/14; Y02T 90/128; Y02T 90/163; Y02T 10/7072; Y02T 90/121; Y02T 90/127; Y02T 10/7088; Y02T 90/169; Y02T 10/7241; Y02T 10/7216; Y02T 90/125; Y02T 10/725; Y02T 90/16; Y02T 10/7055; Y02T 10/7094; Y02T 10/7291; Y02T 90/12; Y02E 60/721; Y04S 10/126; Y04S 30/14; H01F 38/14; H01F 2003/005; H01F 27/2823; H01F 37/00; H01F 27/2804; H01F 27/42; H01Q 7/00; H04B 5/0037; H04B 5/0075; H04B 5/0081; B60R 16/03; B60K 35/00; B60K 2350/1004; B60K 2350/1096; G01C 21/165; G01C 21/265; G01C 21/36; G01S 19/13; G01S 19/49; G01S 17/026; G01S 17/48; G06F 3/0482; G06F 3/04842; G06F 3/04847; G06F 19/00; G06F 19/34; G06T 2207/10032; G06T 2207/30181; G06T 2207/30252; G06T 11/60; H01M 10/46; H04M 1/7253; H04N 13/0239; H04N 13/106; H04N 13/204; H04N 13/271; H04N 2013/0081; H04N 2005/4444; H04N 5/4403; H04N 7/18; H05K 7/02; Y02B 10/30; Y02P 90/60; Y10S 323/911; Y10T 307/50; Y10T 307/696; Y10T 307/707; Y10T 307/718; Y10T 307/729; A47J 31/52; A47J 36/32; A61B 5/747; A61B 2205/07; A61B 5/02438; A61B 5/0533; A61B 5/1116; A61B 5/1172; A61B 5/1176; A61B 5/163; A61B 5/165; A61B 5/167; A61B 5/4088; A61B 5/4803; G09B 21/007; A61F 4/00; A61N 1/3787; G02B 2027/014; G02B 2027/0178; G02B 27/0172; G05B 19/0426; G05B 2219/2642; G08B 21/12; G08B 3/10; G08C 17/00; G08C 2201/20; G08C 2201/30
USPC ....... 340/944, 947, 950, 951, 953, 964, 965, 340/992–994, 995.2, 427, 446, 525
See application file for complete search history.

(56) References Cited

U.S. PATENT DOCUMENTS

| | | | |
|---|---|---|---|
| 2003/0231789 A1* | 12/2003 | Willis | A61B 5/0073 382/128 |
| 2012/0268563 A1* | 10/2012 | Chou | A61H 3/061 348/46 |
| 2013/0034231 A1 | 2/2013 | Meletio | |
| 2013/0115579 A1* | 5/2013 | Taghavi | G06F 3/016 434/113 |
| 2015/0030159 A1 | 1/2015 | Ozcan | |
| 2016/0063893 A1* | 3/2016 | Kanuganti | G09B 21/001 348/62 |
| 2017/0245069 A1* | 8/2017 | Moriguchi | H04B 11/00 |
| 2018/0025243 A1* | 1/2018 | Chandraker | H04L 63/1483 382/118 |
| 2018/0072535 A1* | 3/2018 | Hiltunen | H04W 4/80 |

\* cited by examiner

SYSTEM AND APPLICATION FOR AUDITORY GUIDANCE AND SIGNALING

TECHNICAL FIELD

The technical field generally relates to the field of vehicles and other platforms and, more specifically, to systems and methods for auditory guidance and signaling for vehicles and other platforms.

INTRODUCTION

Many vehicles and other platforms include doors, other portals, paths, and/or other locations to which individuals may be directed, such as a vehicle door, a building door, a hallway or other path, and so on. However, in certain situations, it may be difficult for an individual to view the location, for example, if the individual is visually impaired and/or if conditions for visibility are unfavorable in proximity to the location (e.g., if dust, fog, smoke, and/or other conditions may limit visibility).

Accordingly, it is desirable to provide methods and systems for vehicles and/or other platforms that provide auditory guidance and/or signaling to direct individuals to desired locations, such as doors, other portals, paths, and/or other locations for vehicles and/or other platforms. Furthermore, other desirable features and characteristics of the present invention will become apparent from the subsequent detailed description and the appended claims, taken in conjunction with the accompanying drawings.

SUMMARY

In accordance with exemplary embodiments, a method includes receiving information pertaining to a guidance task to provide auditory guidance proximate a location for a platform; selecting, via a processor, a plurality of transducers proximate the location, the plurality of transducers including: a first transducer disposed on a first side of the location or target; and a second transducer disposed on a second side of the location or target, opposite the first side; and controlling, via the processor, the plurality of transducers to provide auditory signals, such that the first transducer and the second transducer produce respective auditory signals that are phase cancelled with respect to one another, to thereby provide the auditory guidance to the location.

Also in one embodiment, the step of controlling the plurality of transducers includes controlling the plurality of transducers such that the auditory signals have relatively less magnitude in a plane that is orthogonal to the location, as compared with regions surrounding the location, such that an individual can follow the relatively less magnitude of the auditory signals along the plane to the location or target.

Also in one embodiment, the step of selecting the plurality of transducers includes selecting the plurality of transducers such that the first transducer and the second transducer are disposed an equal distance from the location or target.

Also in one embodiment, the first transducer includes a first loudspeaker, the second transducer includes a second loudspeaker, and the step of controlling the plurality of transducers includes controlling the first loudspeaker and the second loudspeaker such that respective sound waves of the first loudspeaker and the second loudspeaker are equal in magnitude, but with respective phases that are inverted relative to one another. This may be accomplished through use of a signal processing controller, wiring transducers to be out-of-phase, recording stereo program material with out-of-phase elements, inverting the phase of one input on a stereo amplifier or mono amplifier set, or other mechanisms to achieve the out-of-phase signal end result.

Also in one embodiment, having stereo audio material prepared in advance may utilize both in phase verbal instruction and out-of-phase guide tones in the same program material.

Also in one embodiment, the step of receiving information pertaining to the guidance task includes receiving information pertaining to a person having a visual impairment who is to move to the location. As an example, the exit row of an aircraft may be identified via speakers arranged on either side of the row such that escaping passengers can perceive the phase cancellation to indicate the portal as they move parallel to the plane of the portal along the aisle. (Providing guidance to target utilizing an intersect of the guide path as opposed to following the length of the guide path.)

Also in one embodiment, the step of receiving information pertaining to the guidance task includes receiving inputs via a transceiver; and the method further includes identifying the guidance task, via the processor, based on the inputs.

Also in one embodiment, the step of receiving information pertaining to the guidance task includes receiving information pertaining to auditorily guiding a person to a portal of the platform; and the step of selecting the plurality of transducers includes selecting the plurality of transducers such that: the first transducer is disposed on a first side of the portal; and the second transducer is disposed on a second side of the portal, opposite the first side.

Also in one embodiment, the step of receiving information includes receiving information pertaining to auditorily guiding the person to a door of a vehicle; and the step of selecting the plurality of transducers includes selecting the plurality of transducers such that: the first transducer is disposed on a first side of the door; and the second transducer is disposed on a second side of the door, opposite the first side.

Also in one embodiment, the step of receiving information pertaining to the guidance task includes receiving information pertaining to auditorily guiding a person to a path of the platform; and the step of selecting the plurality of transducers includes selecting the plurality of transducers such that: the first transducer is disposed on a first side of the path; and the second transducer is disposed on a second side of the path, opposite the first side.

In another exemplary embodiment, a system is provided that includes a first module and a second module. The first module is configured to receive information as to a guidance task to provide auditory guidance proximate a location of a platform. The second module is configured to select, via a processor, a plurality of transducers proximate the location, and control, via the processor, the plurality of transducers to provide auditory signals, such that the first transducer and the second transducer produce respective auditory signals that are phase cancelled with respect to one another, to thereby provide the auditory guidance to the location. The plurality of transducers include: a first transducer disposed on a first side of the location; and a second transducer disposed on a second side of the location, opposite the first side and positioned at a distance apart such that the phase cancellation line aligns with the intended target, portal or path.

Also in one embodiment, wherein the second module is configured to control the plurality of transducers such that the auditory signals have relatively less magnitude in a plane that is orthogonal to the location, as compared with regions surrounding the location, such that an individual can follow the relatively less magnitude of the auditory signals along the plane to the location.

Also in one embodiment, wherein the second module is configured to select the plurality of transducers such that the first transducer and the second transducer are disposed an equal distance from the location.

Also in one embodiment, wherein the first module is configured to receive information as to an individual having a visual impairment who is to move to the location.

Also in one embodiment, wherein: the guidance task pertains to auditorily guiding a person to a portal of the platform; and the second module is configured to select the plurality of transducers such that: the first transducer is disposed on a first side of the portal; and the second transducer is disposed on a second side of the portal, opposite the first side.

Also in one embodiment, wherein: the platform includes a vehicle; and the portal includes a door of the vehicle.

Also in one embodiment, wherein: the platform includes an arbitrary target of interest, such as an ATM, a water fountain, or other such apparatus.

Also in one embodiment, the guidance task pertains to auditorily guiding a person to a path of the platform; and the second module is configured to select the plurality of transducers such that: the first transducer is disposed on a first side of the path; and the second transducer is disposed on a second side of the path, opposite the first side.

In another exemplary embodiment, a system is provided that includes an input device, a plurality of transducers, and a processor. The input device is configured to receive information as to a guidance task to provide auditory guidance proximate a location of a platform. The processor is configured to: select a first transducer and a second transducer of the plurality of transducers, such that: the first transducer is disposed on a first side of the location; and the second transducer is disposed on a second side of the location, opposite the first side; and control the first transducer and the second transducer to provide auditory signals, such that the first transducer and the second transducer produce respective auditory signals that are phase cancelled with respect to one another, to thereby provide the auditory guidance to the location.

Also in one embodiment, the processor is configured to control the plurality of transducers such that the auditory signals have relatively less magnitude in a plane that is orthogonal to the location, as compared with regions surrounding the location, such that an individual can follow the relatively less magnitude of the auditory signals along the plane to the location.

Also in one embodiment, the platform includes a vehicle; and the system is configured for implementation in the vehicle.

Also in one embodiment, the vehicle includes a door; and the input device includes a transceiver that is configured to receive information as to an individual having a visual impairment who is to enter the vehicle through the door.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
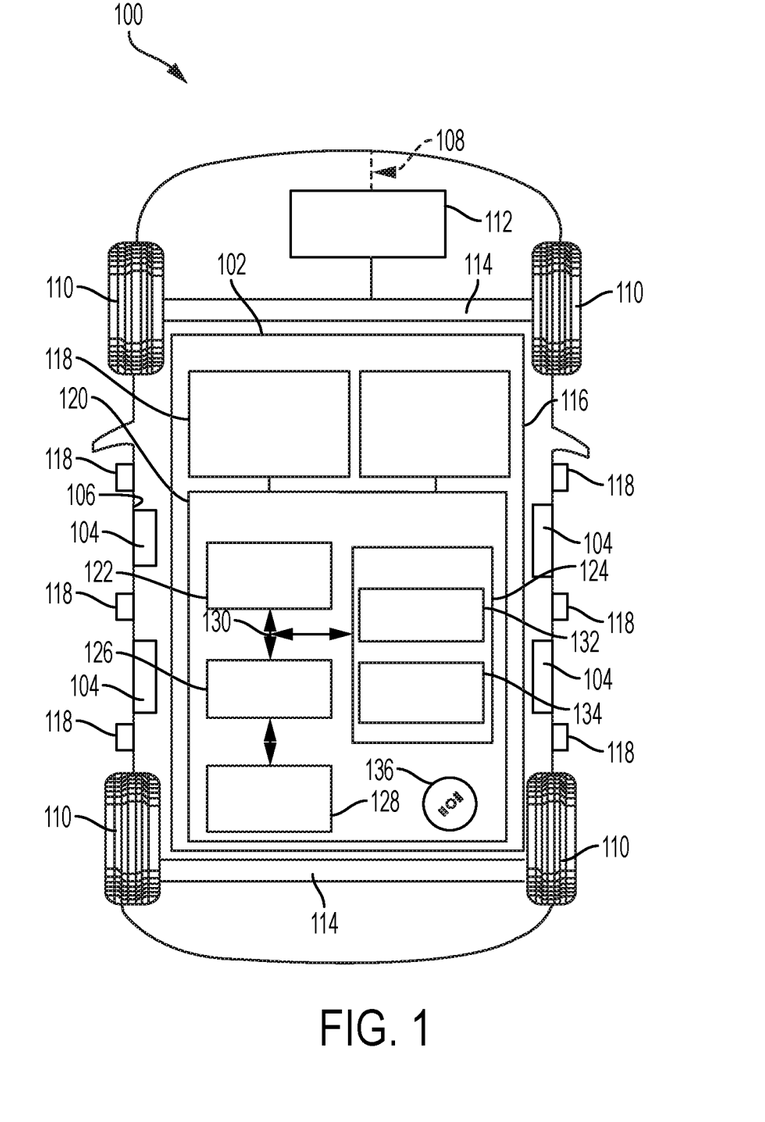
FIG. 1 is a functional block diagram of a platform, namely a vehicle, that includes a control system for providing auditory guidance and signaling via transducers using phase cancellation to direct individuals to a specific location of the platform, such as a door, in accordance with exemplary embodiments.

FIG. 1 illustrates a platform 100 having a control system 102 for providing auditory guidance and signaling for the platform 100, in accordance with exemplary embodiments. As described in greater detail below, the control system 102 includes an input device 116, transducers 118, and a controller 120 that provide auditory guidance and signaling for the platform 100 via phase cancellation for the transducers 118, for example as described in greater detail further below in connection with various embodiments.

As depicted in FIG. 1, in certain embodiments, the platform 100 comprises a vehicle, such as an automobile. While the platform 100 may be hereafter referred to as a vehicle 100 (and depicted as an automobile in FIG. 1 and described below in connection therewith), it will be appreciated that the control system 102 described herein may be implemented in any number of different types of platforms. For example, in various embodiments, the platform 100 may comprise any number of different types of automobiles (e.g., taxi cabs, vehicle fleets, buses, sedans, wagons, trucks, sport utility vehicles, and other automobiles), other types of vehicles (e.g., marine vehicles, locomotives, aircraft, spacecraft, and other vehicles), other mobile platforms, buildings or rooms (e.g., bus stations, train stations, airports, offices, waiting rooms, and other buildings, rooms, or areas) and/or components thereof.

In various embodiments, the vehicle 100 includes a body 106 that is arranged on a chassis 108. The body 106 substantially encloses other components of the vehicle 100. As shown in FIG. 1, various doors 104 (referenced above) are formed within the body, for example for individuals to enter the vehicle 100. The body 106 and the chassis 108 may jointly form a frame. The vehicle 100 also includes a plurality of wheels 110. The wheels 110 are each rotationally coupled to the chassis 108 near a respective corner of the body 106 to facilitate movement of the vehicle 100. In one embodiment, the vehicle 100 includes four wheels 110, although this may vary in other embodiments (for example for trucks and certain other vehicles).

A drive system 112 is mounted on the chassis 108, and drives the wheels 110, for example via axles 114. The drive system 112 preferably comprises a propulsion system. In certain exemplary embodiments, the drive system 112 comprises an internal combustion engine and/or an electric motor/generator, coupled with a transmission thereof. In certain embodiments, the drive system 112 may vary, and/or two or more drive systems 112 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In various embodiments, the control system 102 is utilized to provide auditory guidance for individuals who may desire to enter the vehicle 100 through one or more of the doors 104. In other embodiments, the control system 102 may provide auditory guidance with respect to one or more other portals, paths, and/or other locations with respect to any number of different types of platforms (e.g., with respect to a walkway near the vehicle 100 and/or platform, a door for a building, and so on).

As depicted in FIG. 1 and noted above, the control system 102 includes the above-referenced input device 116, transducers 118, and controller 120 in various embodiments.

In various embodiments, the input device 116 receives information regarding one or more guidance tasks that may be needed for desired for the vehicle 100. In certain embodiments, the input device 116 comprises one or more transceivers, receivers, and/or other communication devices and/or other input devices for obtaining information regarding any individuals that may desire to enter the vehicle 100, and regarding any particular needs for the individuals with respect to viewing the doors 104 and/or other locations of interest. For example, in one embodiment, the vehicle 100 may be utilized in connection with an autonomous ride service, and the input device 116 may receive information that an individual is to approach the vehicle 100 for entry into the vehicle 100, along with any particular needs of the individual (e.g., any visual impairment or the like) and/or circumstances surrounding the vehicle 100 (e.g., fog, smoke, or the like) that may otherwise make it challenging for the individual to reach the door 104.

In certain embodiments, the input device 116 could comprise any number of different types of devices and/or systems that serve as a request and/or trigger for auditory guidance. For example, in certain embodiments, the input device 116 could be a switch, a sensor, and/or other device that is triggered any time one of the doors 104 open, by way of example. In certain embodiments, the input device 116 may comprise the same switch that turns on interior lighting for the vehicle 100. In other embodiments, the input device 116 may be triggered via any number of other means, simple or elaborate, for example to take effect and/or be triggered for particular customers in response to particular alarms and/or hazard conditions, and so on, in various embodiments.

Also in certain embodiments, the input device 116 may comprise a personal transducer and/or a personal portable electronic device (e.g., a cell phone). In addition, in various embodiments, such a personal input device 116 may be used to trigger the request for audio guidance from the individual's device.

Also in various embodiments, the transducers 118 are configured to provide auditory guidance for the individual to reach the desired location (e.g., one of the doors 104). In certain embodiments, the transducers 118 comprise loudspeakers that are controlled via the controller 120. In various embodiments, for a particular desired location (e.g., one of the doors 104), multiple transducers 118 are utilized, on opposite ends of the desired location (and, in various embodiments, spaced an equal respective distance from the door 104), and positioned at a distance apart such that the phase cancellation line aligns with the intended target, portal or path. Also in various embodiments, the transducers 118 on the opposite ends of the desired location (e.g., one of the doors 104) provide sound signals in a manner using phase cancellation, based on instructions provided by the controller 120. In various embodiments, the phase cancellation is provided such that the individual will hear a loudspeaker sound with relatively lower volume (or no volume at all) when the individual is near the location (e.g., door 104) and/or on a trajectory that is orthogonal to the location (e.g., door 104), and will otherwise hear a loudspeaker sound with relatively louder volume when the individual is farther from the location (e.g., door 104) and/or trajectory that is orthogonal thereto.

As depicted in FIG. 1, in certain embodiments the transducers 118 (e.g., loudspeakers) are disposed on opposing sides of the doors 104 of the vehicle 100 (e.g., to facilitate an occupant's entry into the vehicle 100). It will be appreciated that in various embodiments, the transducers 118 may also be disposed at any number of other locations of the vehicle 100.

Also in certain embodiments, per the discussion above, the request may be initiated from a user near the target location (e.g., via a personal electronic device comprising the input device 116), and may pertain to the individual's desire to access a particular target location, such as drinking fountain, bathroom, or the like. In certain embodiments, upon this trigger, transducers 118 (e.g., loudspeakers) on both sides of the target location would begin sounding. Then, also in various embodiments, the user would first move towards the sound, and would then follow the centered path to the target by following the null field (e.g., by following the reduced or absent sound along the center of the path to the target). Also in certain embodiments, the auditory guidance may also include, among other possible features, a rotating siren device (instead of or in addition to having fixed or stationary loudspeakers), for example that provides a noticeable change in tone and amplitude when passing through the phase-cancellation zone. This change in tone may be used to aid an observer in locating the point of origin.

In various embodiments, the controller 120 controls operation of the control system 102, including the input device 116 and transducers 118 thereof. For example, in certain embodiments, the controller 120 makes identifications as to auditory guidance that may be needed for particular situations based on data obtained from the input device 116. Also in certain embodiments, the controller 120 further provides for selection of applicable transducers 118, along with instructions for phase cancellation thereof, to provide the auditory guidance using the transducers 118.

In various embodiments, the transducers 118 (e.g., loudspeakers) are controlled in a manner that provides an audible null within the sound field as a directional indicator as associated with solving the problem of a non-sighted or sound-impaired person finding their way to the proper portal, for example in the case of a driverless vehicle 100. In certain embodiments, the phases and/or polarity of the transducers 118 may be adjusted by the controller 120 (discussed below) in real time. In certain other embodiments, the transducers 118 may not be used for other purposes except for the auditory guidance described herein. As such, in certain embodiments, the transducers 118 may not be used for other purposes that may require them to be in phase. Also in certain embodiments, the orthogonal line centered on the portal is the only path for indication. Accordingly, in certain embodiments, the transducers 118 may be wired with opposite polarity for this function, rather than having their polarities being adjusted in real time.

As depicted in FIG. 1, in various embodiments, the controller 120 comprises a computer system. In certain embodiments, the controller 120 may also include the input device 116, the transducers, 118, and/or components thereof, in whole or in part. In addition, it will be appreciated that the controller 120 may otherwise differ from the embodiment depicted in FIG. 1. For example, the controller 120 may be coupled to or may otherwise utilize one or more remote computer systems and/or other control systems, for example as part of one or more of the above-identified vehicle 100 devices and systems.

In the depicted embodiment, the computer system of the controller 120 includes a processor 122, a memory 124, an interface 126, a storage device 128, and a bus 130. The processor 122 performs the computation and control functions of the controller 120, and may comprise any type of processor or multiple processors, single integrated circuits such as a microprocessor, or any suitable number of integrated circuit devices and/or circuit boards working in cooperation to accomplish the functions of a processing unit. During operation, the processor 122 executes one or more programs 132 contained within the memory 124 and, as such, controls the general operation of the controller 120 and the computer system of the controller 120, generally in executing the processes described herein, such as the method 500 described further below in connection with FIG. 5, and the illustrations and implementation discussed below in connection with FIGS. 2-5.

The memory 124 can be any type of suitable memory. For example, the memory 124 may include various types of dynamic random access memory (DRAM) such as SDRAM, the various types of static RAM (SRAM), and the various types of non-volatile memory (PROM, EPROM, and flash). In certain examples, the memory 124 is located on and/or co-located on the same computer chip as the processor 122. In the depicted embodiment, the memory 124 stores the above-referenced program 132 along with one or more stored values 134.

The bus 130 serves to transmit programs, data, status and other information or signals between the various components of the computer system of the controller 120. The interface 126 allows communication to the computer system of the controller 120, for example from a system driver and/or another computer system, and can be implemented using any suitable method and apparatus. In one embodiment, the interface 126 obtains the various data from the input device 116 (e.g., a transceiver). The interface 126 can include one or more network interfaces to communicate with other systems or components. The interface 126 may also include one or more network interfaces to communicate with technicians, and/or one or more storage interfaces to connect to storage apparatuses, such as the storage device 128.

The storage device 128 can be any suitable type of storage apparatus, including direct access storage devices such as hard disk drives, flash systems, floppy disk drives and optical disk drives. In one exemplary embodiment, the storage device 128 comprises a program product from which memory 124 can receive a program 132 that executes one or more embodiments of one or more processes of the present disclosure, such as the steps of the method 500 (and any sub-processes thereof) described further below in connection with FIG. 5. In another exemplary embodiment, the program product may be directly stored in and/or otherwise accessed by the memory 124 and/or a disk (e.g., disk 136), such as that referenced below.

The bus 130 can be any suitable physical or logical means of connecting computer systems and components. This includes, but is not limited to, direct hard-wired connections, fiber optics, infrared and wireless bus technologies. During operation, the program 132 is stored in the memory 124 and executed by the processor 122.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 122) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 120 may also otherwise differ from the embodiment depicted in FIG. 1, for example in that the computer system of the controller 120 may be coupled to or may otherwise utilize one or more remote computer systems and/or other control systems.

Figure 2:
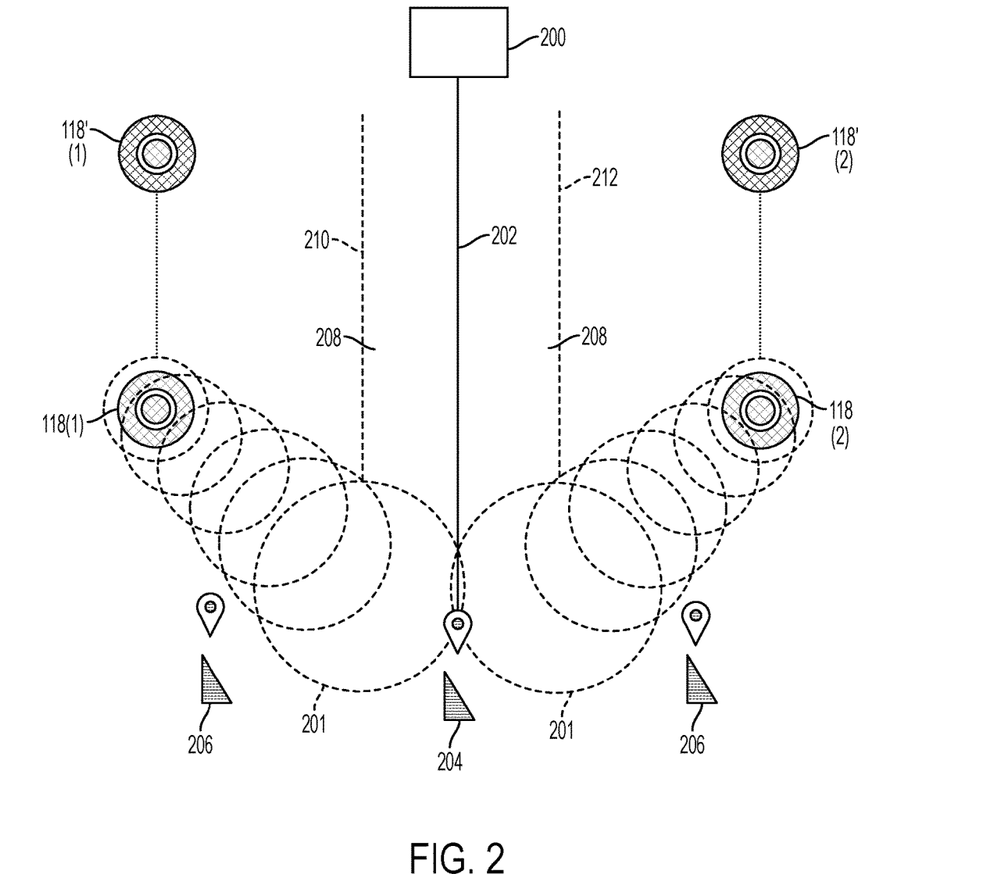
FIGS. 2, 6, and 7 provide diagrams of exemplary implementations of transducers of the control system of FIG. 1, in accordance with exemplary embodiments.

FIG. 2 provides a diagram of an exemplary implementation of transducers 118 of the control system 102 of FIG. 1, in accordance with exemplary embodiments. Specifically, FIG. 2 depicts multiple transducers 118 utilized for auditory guidance with respect to a portal 200, in various embodiments. In various embodiments, the portal 200 comprises a location/destination that a nearby individual wishes to reach, such as one of the doors 104 of the vehicle 100 of FIG. 1. In other embodiments, the portal 200 may comprise any number of other different desired locations, such as an opening and/or door for a building and/or other platform. In certain embodiments, the portal 200 may comprise an emergency escape door for a bus, aircraft, and/or other vehicle and/or other platform.

In certain embodiments, first and second transducers 118(1) and 118(2), respectively, are placed on opposing sides of, and equally spaced apart from, the portal 200. In addition, as depicted in FIG. 1, in various embodiments, the respective first and second transducers 118(1) and 118(2) provide loudspeaker sounds that are in phase cancellation with one another, based on instructions provided via a controller (such as the processor 122 of the controller 120 of FIG. 1) or by any other method (such as listed in Paragraph [0007] above).

Figure 3:
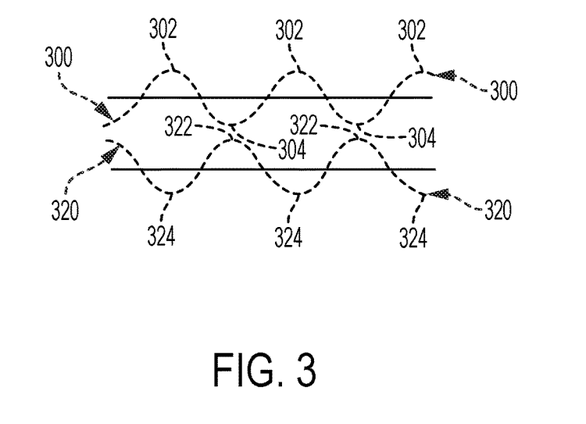
FIG. 3 is a graphical illustration of an exemplary phase cancellation implementation of the transducers of FIGS. 1 and 2, in accordance with exemplary embodiments.

With reference to FIG. 3, a graphical illustration of an exemplary phase cancellation implementation of the transducers 118(1) and 118(2) of FIG. 2. Specifically, in various embodiments, a first sound wave 300 is depicted for the first transducer 118(1) of FIG. 2, and a second sound wave 320 for the second transducer 118(2) of FIG. 2. As shown in FIG. 3, in various embodiments, the respective amplitudes of the first and second sound waves 300, 320 are equal in magnitude, but the phases are inverted. For example, (i) the first sound wave 300 has its peaks 302 at the same time that the second sound wave 320 has its valleys 324; and (ii) the first sound wave 300 has its valleys 304 at the same time that the second sound wave 320 has its peaks 322.

Accordingly, with reference back to FIG. 2, an individual will hear the transducer (e.g., loudspeaker) sound(s) with relatively less magnitude (or none at all) when the individual is within an orthogonal plane 202 (or direction) that is orthogonal with respect to the portal 200, for example at point 204. Conversely, the individual will hear the transducer (e.g., loudspeaker) sound(s) with relatively greater magnitude when the individual is apart from, or strays away from, the orthogonal plane 202 (or direction) with respect to the portal 200, for example at points 206.

Thus, in various embodiments, the individual may reach the portal 200 by continuing to move along the plane 202 (or direction) that is orthogonal with respect to the portal 200, as the individual will continue to experience the reduced loudspeaker sound (or none at all) as he or she moves along the plane 202 or direction that is orthogonal with respect to the portal 200. Also in various embodiments, if the individual hears an increase in the loudspeaker sound as the individual may stray from the plane 202 (or direction) that is orthogonal with respect to the portal 200, then the individual may accordingly know to move back where the sound is reduced (i.e., back to the plane 202 (or direction) that is orthogonal with respect to the portal 200) for movement toward the portal 200. Accordingly, in various embodiments, an individual can follow the relatively lower magnitude of the auditory signals along the plane 202 to the location (e.g., to the desired portal 200).

Similar to the discussion above, in various embodiments, the transducers 118 (e.g., loudspeakers) are controlled in a manner that provides an audible null within the sound field as a directional indicator as associated with solving the problem of a non-sighted or sound-impaired person finding their way to the proper portal, for example in the case of a driverless vehicle 100. In certain embodiments, the phases and/or polarity of the transducers 118 may be adjusted by a controller (e.g., controller 120 of FIG. 1, discussed above) in real time. In certain embodiments, a controller may not be needed. For example, in certain other embodiments, the transducers 118 may not be used for other purposes that may require them to be in phase, and the orthogonal line centered on the portal is the only path for indication. Accordingly, similar to the discussion above, in certain embodiments, the transducers 118 may be wired with opposite polarity for this function, rather than having their polarities being adjusted in real time.

Also in various embodiments, the user (or individual requiring auditory guidance) would navigate toward the sound emanating from the transducers 118, and would know that they are aligned with the center of the opening (e.g., plane 202) when the phase cancellation is perceived.

In addition, in various embodiments, if it were desired null field at various angles, the tones or recorded message may be phase shifted in the recording process. For example, in various embodiments, using conventional stereo technology one could choose to play the ninety degree tones, the seventy-five degree tones, the forty-five degree tones, and so on, through selection of which audio file corresponds to that phase angle.

Also as depicted in FIG. 2, in certain embodiments, additional transducers (e.g., loudspeakers) may also be utilized to provide auditory guidance for a path 208, as is also depicted in FIG. 2. As depicted in FIG. 2, in one example, the path 208 is bounded by a first side 210 and a second side 212. Also in the depicted example, one or more additional first transducers (e.g., loudspeakers) 118'(1) may aligned with the first transducer (e.g., loudspeaker) 118(1) along the first side 210; and one or more additional second transducers (e.g., loudspeakers) 118'(2) may be aligned with the second transducer (e.g., loudspeaker) 118(2) along the second side 212. Accordingly, in this embodiment, an individual would similarly be guided to stay within the path 208. For example, in various embodiments, as an individual is moving within the path 208 (or within a center of the path 208), the individual will hear transducer sounds with relatively less magnitude (and will thus be guided to stay along the path 208 or the center thereof). Conversely, in various embodiments, as an individual strays from the path 208 (or a center of the path 208), the individual will hear transducer sounds with relatively higher magnitude (and will thus be guided to move again back toward the path 208 or the center thereof).

Figure 6:
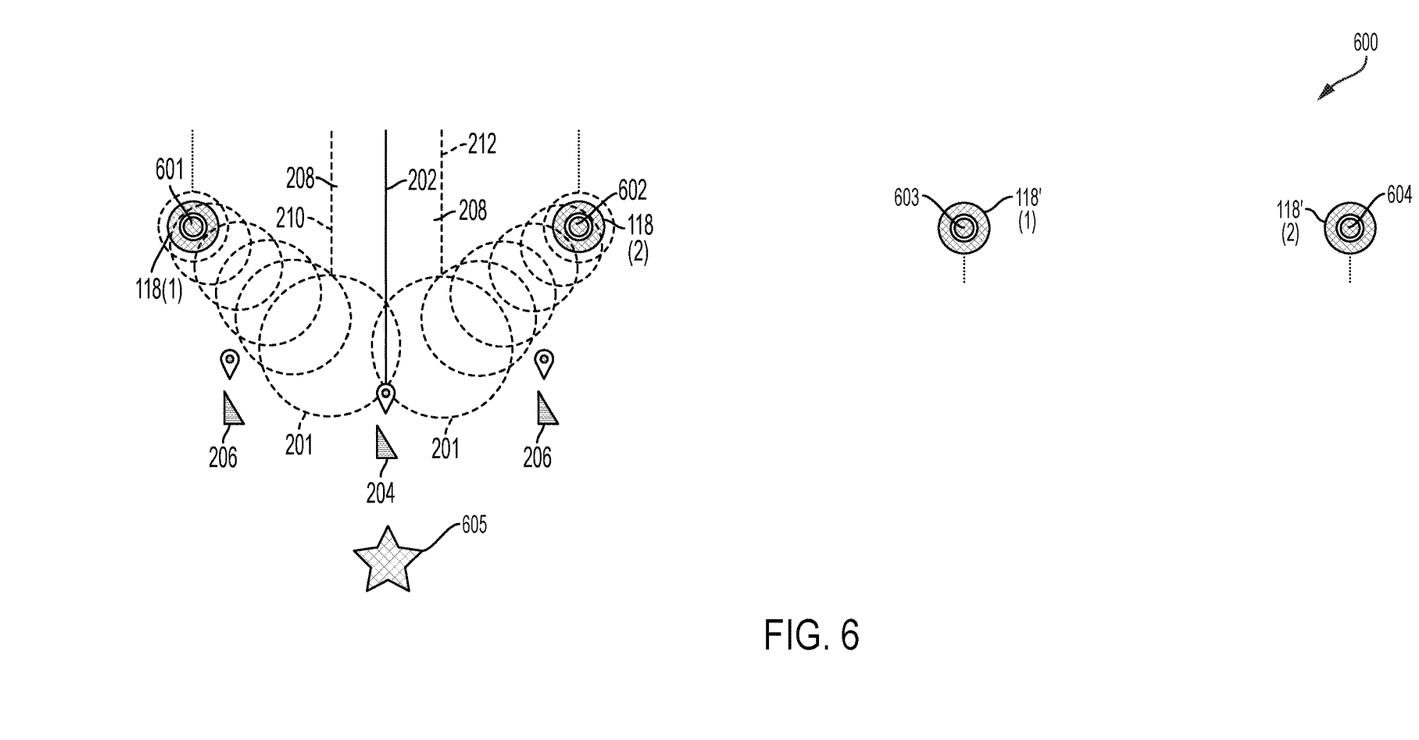
Figure 7:
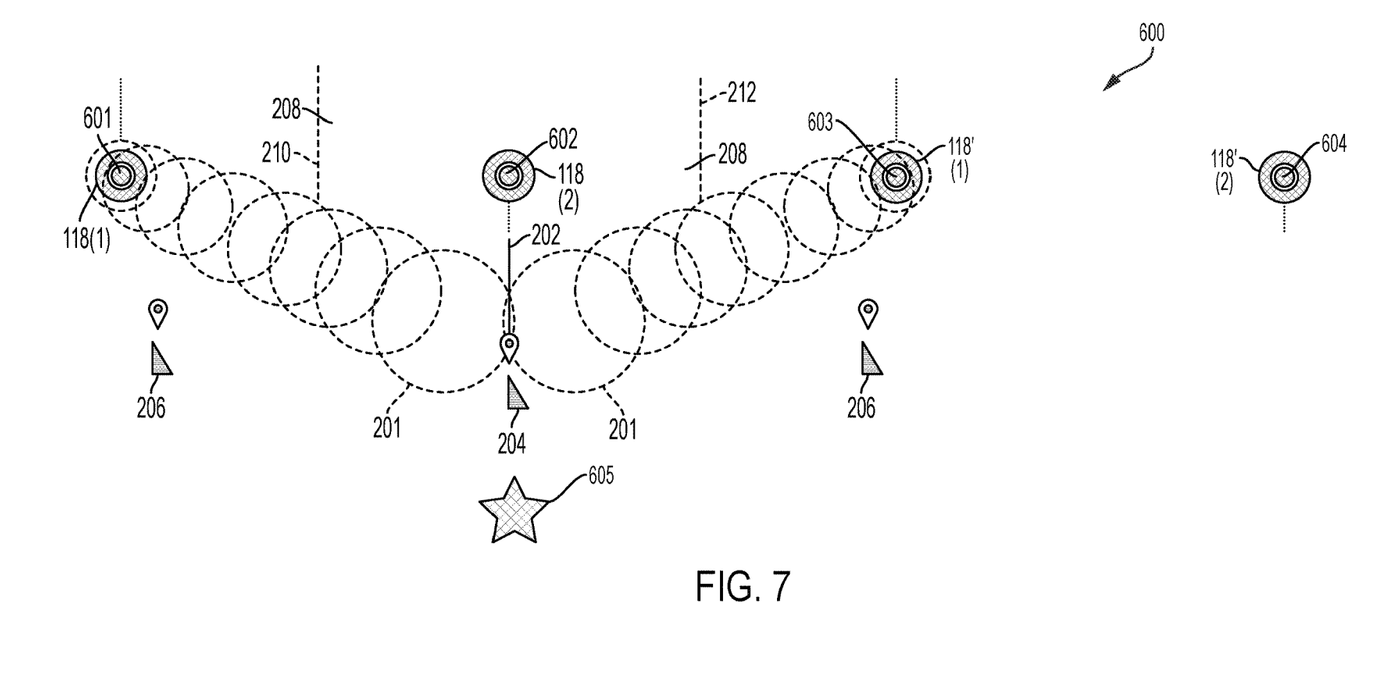

With reference to FIGS. 6 and 7, the concepts of FIG. 2 may be extended with respect to additional scenarios involving more than two transducers 118 that are spaced apart. For example, FIG. 6 provides an illustration 600 with an embodiment similar to that of FIG. 2, but with four transducers 601, 602, 603, and 604 spaced apart. Likewise, FIG. 7 provides another illustration 700 with an embodiment similar to that of FIG. 2, but with four transducers 701, 702, 703, and 704 spaced apart. As illustrated in FIGS. 6 and 7, in various embodiments, the target line and center point may be moved based on the selection of the transducers (e.g., by the controller 120 of FIG. 1). For example, in certain embodiments, as shown in illustration 600 of FIG. 6, if a first transducer 601 and a second transducer 602 are selected, then the center point (and associated target line) may correspond to location 605 as depicted in FIG. 6. Conversely, by way of additional example, also in certain embodiments, as shown in illustration 700 of FIG. 7, if a first transducer 701 and a third transducer 703 are instead selected, then the center point (and associated target line) may correspond to location 607 as depicted in FIG. 7, and so on.

Figure 4:
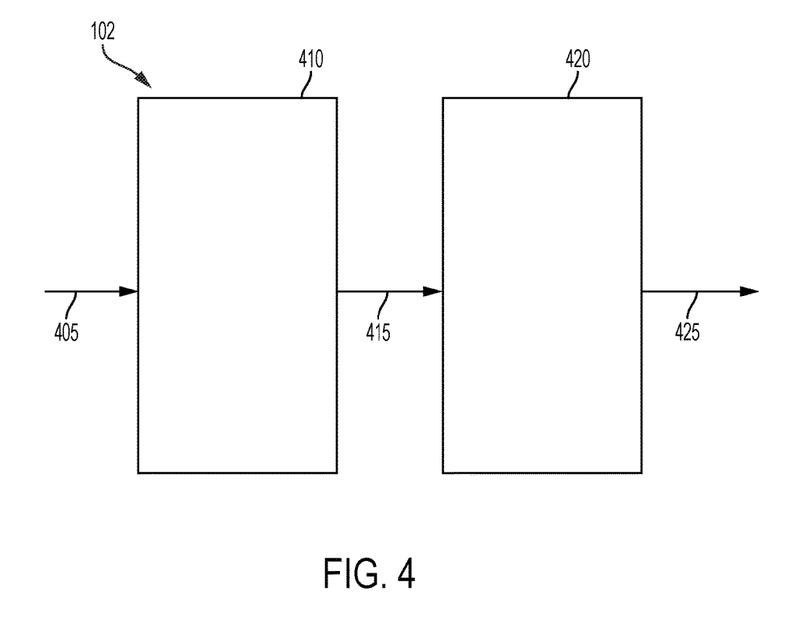
FIG. 4 provides a functional block diagram for modules of the control system of FIG. 1, in accordance with exemplary embodiments.

FIG. 4 provides a functional block diagram for modules of the control system 102 of FIG. 1, in accordance with exemplary embodiments. As depicted in FIG. 4, in various embodiments, the control system 102 generally includes an input module 410 and a transducer control processing module 420. In various embodiments, the input module 410 and transducer control processing module 420 are disposed onboard the vehicle 100. As can be appreciated, in certain embodiments, parts of the control system 102 may be disposed on a system remote from the vehicle 100 while other parts of the control system 102 may be disposed on the vehicle 100.

In various embodiments, the input module 410 obtains data pertaining to the input device 116 of FIG. 1. For example, in certain embodiments, the input module 410 receives, as inputs 405, data from or via the input device 116 of FIG. 1, regarding any individuals that may desire to enter the vehicle 100, and regarding any particular needs for the individuals with respect to viewing the doors 104 and/or other locations of interest. For example, as discussed above, the information may pertain to an individual that is to approach the vehicle 100 for entry into the vehicle 100 (or other platform), along with any particular needs of the individual (e.g., any visual important or the like) and/or circumstances surrounding the vehicle 100 or other platform (e.g., fog, smoke, or the like) that may otherwise make it challenging for the individual to reach the door 104 (or other location of interest). In addition, in certain embodiments, the input module 410 may process the information (e.g., using one or more processors, such as the processor 122 of FIG. 1) in order to make the determinations as to the individual, the door or other location of interest, including any desired auditory guidance tasks. Also in various embodiments, the data and/or determinations pertaining thereto are provided as outputs 415 to the transducer control processing module 420.

In various embodiments, the transducer control processing module 420 receives the information and/or determinations (e.g., as to the auditory guidance tasks) from the input module 410 as inputs 415 to the transducer control processing module 420. Also in various embodiments, transducer control processing module 420 provides instructions for the providing of the auditory guidance tasks via control of the transducers 118. Specifically, in various embodiments, one or more processors (e.g., the processor 122 of FIG. 1) selects appropriate transducers 118 that are equally spaced apart on opposite sides of the door (or other portal or path corresponding to the auditory guidance task), and provides instructions for the phase cancellation operation of the transducers 118 on the opposite sides of the door (or other portal or path). In various embodiments, the transducer control processing module 420 provides the transducer instructions as outputs 425 to the transducers 118 of FIG. 1.

Figure 5:
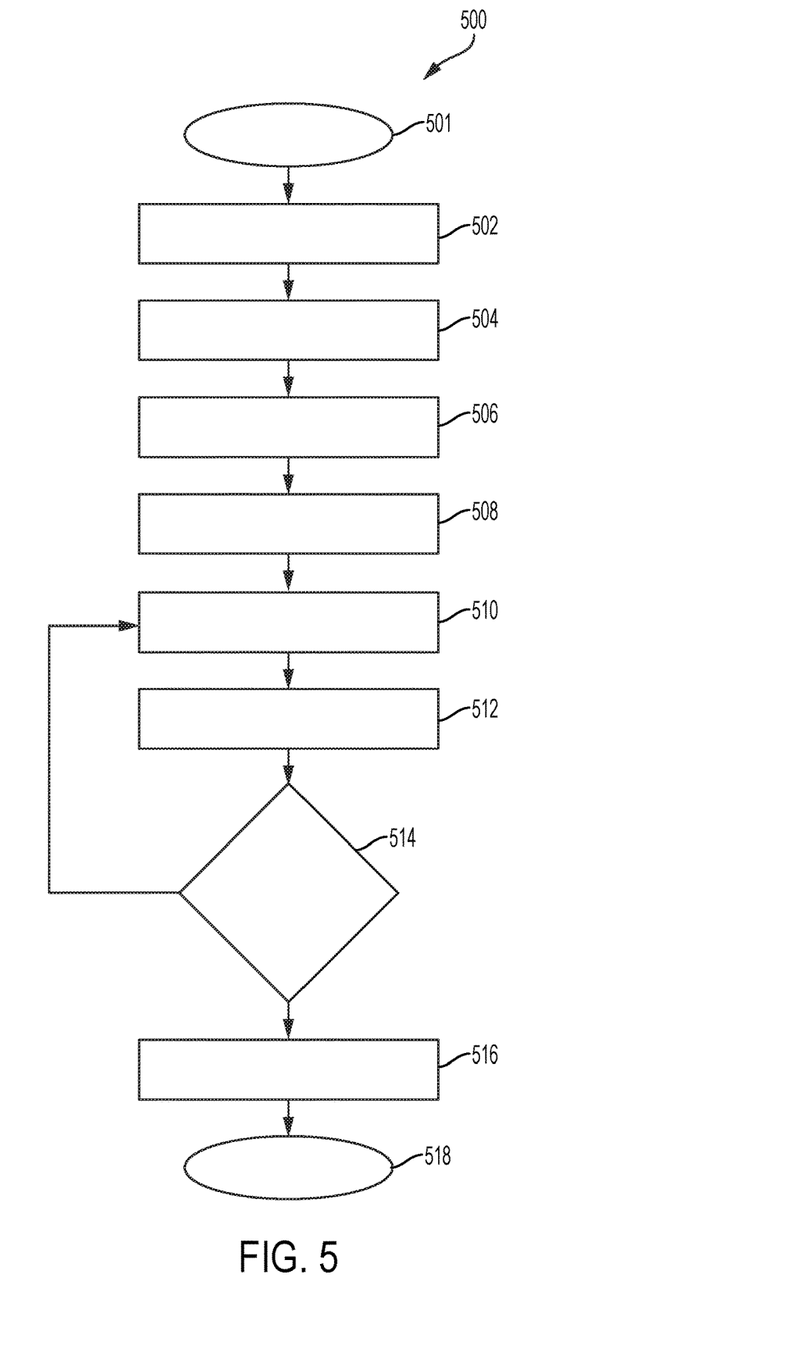
FIG. 5 depicts a flowchart of a method for providing auditory guidance and signaling for the control system and components of FIGS. 1-4, in accordance with exemplary embodiments.

FIG. 5 depicts a flowchart of a method 500 for providing auditory guidance and signaling for a location of a platform, in accordance with exemplary embodiments. In various embodiments, the method 500 may be implemented in providing auditory guidance with respect to an individual's movement toward a desired portal 200 (e.g., door 104) and/or path 208, for example for the vehicle 100 and/or any number of other different types of platforms.

As depicted in FIG. 5, in various embodiments the method 500 begins at step 501. In various embodiments, the process begins at 501 when the vehicle 100 and/or control system 102 is turned on, or when a request is received, or the like.

In various embodiments, inputs are received at step 502. In various embodiments, inputs are received regarding any individuals that may desire to enter the vehicle 100 via a door 104 (and/or access or move to or along one or more other portals, paths, or other locations with respect to the vehicle 100 and/or other platform). Also in various embodiments, inputs may be received regarding any particular needs for the individuals with respect to viewing the location of interest. For example, as discussed above, the information may pertain to an individual that is to approach the vehicle 100 for entry into the vehicle 100 (or other platform), along with any particular needs of the individual (e.g., any visual important or the like) and/or circumstances surrounding the vehicle 100 or other platform (e.g., fog, smoke, or the like) that may otherwise make it challenging for the individual to reach the door 104 (or other location of interest). In various embodiments, the inputs are obtained via the input device 116 (e.g., a transceiver) of FIG. 1, as inputs 405 via the input module 410 of FIG. 4. In certain embodiments, the inputs are provided as outputs 415 to the transducer control processing module 420.

In certain embodiments, per the discussion above, the inputs may be initiated from a user near the target location (e.g., via a personal electronic device comprising the input device 116), and may pertain to the individual's desire to access a particular target location, such as a vehicle and/or one or more other target locations such as a drinking fountain, bathroom, or the like.

In certain embodiments, at step 504, determinations are made as to specific auditory tasks based on the inputs of step 502. For example, in various embodiments, determinations are made at step 504 as to a specific path (e.g., path 208 of FIG. 2) or portal (e.g., portal 200 of FIG. 2 and/or door 104 of FIG. 1) for which auditory guidance is required or desired for one or more particular individuals. In various embodiments, these determinations are made by one or more processors (such as the processor 122 of FIG. 1), for example via the input module 410 of FIG. 4. In certain other embodiments, the inputs received at step 502 may already include these determinations. In yet other embodiments, these determinations may be made by the transducer control processing module 420.

In various embodiments, at step 506, specific transducers 118 are selected for use in implementing the auditory guidance. In various embodiments, these selections are made based on the inputs of step 502 and/or the input determinations of step 504. In various embodiments, a selection is made of transducers 118 that are equally spaced apart on opposing sides of the specific location (e.g., portal or path) for the auditory guidance. In various embodiments, these selections and determinations are made by one or more processors (such as the processor 122 of FIG. 1), via the transducer control processing module 420 of FIG. 4.

In addition, in various embodiments, at step 508, phase cancellation instructions are determined for the selected transducers 118 of step 506. Specifically, in certain embodiments, the instructions provide for the transducer(s) 118 on opposing sides of the location to operate with respective amplitudes that are equal in magnitude, but with the phases inverted, for example as described above in connection with FIGS. 2 and 3. In various embodiments, these determinations are made by one or more processors (such as the processor 122 of FIG. 1), via the transducer control processing module 420 of FIG. 4. Per the discussions above, in certain embodiments, adjustments for the phases of the transducers 118 may be required in real time. However, in certain other embodiments, also per the discussions above, the transducers 118 may be pre-wired with opposite polarity for this function, rather than having their polarities being adjusted in real time.

In addition, in various embodiments, at step 510, the phase cancellation instructions are implemented. Specifically, in certain embodiments, the instructions are implemented such that the transducer(s) 118 on opposing sides of the location operate with respective amplitudes that are equal in magnitude, but with the phases inverted, for example as described above in connection with FIGS. 2 and 3. In various embodiments, the phase cancellation instructions are provided by one or more processors (such as the processor 122 of FIG. 1), via the transducer control processing module 420 of FIG. 4 to the transducers 118, and are implemented by the transducers 118 through operation thereof. In certain embodiments, per the discussions above, the transducers 118 may be pre-wired with opposite polarity for this function, rather than having their polarities being adjusted in real time. In certain embodiments, as part of the instructions that are determined at step 508 and implemented at step 510, the transducer sounds may include a verbal description of the desired path or portal and/or appropriate verbal instructions for the individual (e.g., to follow the reduced sound magnitude to the desired path or portal). For example, in certain embodiments, stereo and/or in-phase sounds may include a human voice announcing "Please proceed to the doorway" followed by tones that include the out of phase techniques for providing a pathway to the doorway, and so on. Also in certain embodiments, the announcement might explain how to use "guide tones", or the like. In addition, in certain embodiments, the auditory guidance may also include, among other possible features, a rotating siren device (instead of or in addition to having fixed or stationary loudspeakers), for example that provides a noticeable change in tone and amplitude when passing through the phase-cancellation zone. This change in tone may be used to aid an observer in locating the point of origin.

Accordingly, once the phase cancellation instructions are implemented, auditory guidance is provided for the individual with respect to the desired location (e.g., portal or path). For example, similar to the discussion above with respect to FIGS. 1-4, the individual may be guided to stay within a desired path, or along a direction or plane that is orthogonal to a desired portal, because the transducer sounds are (i) relatively lower in magnitude when moving within the desired path, direction or plane; and (ii) relatively higher in magnitude when straying from the desired path, direction or plane. In addition, in various embodiments, the user (or individual requiring auditory guidance) would navigate toward the sound emanating from the transducers 118, and would know that they are aligned with the center of the opening (e.g., plane 202 of FIG. 2) when the phase cancellation is perceived.

In certain embodiments, additional inputs (e.g., similar to step 502) are continuously obtained at step 512, for example as to whether any individuals still require auditory guidance. Similar to step 512 above, in various embodiments, such additional inputs may be received via the input device 116 and input module 410.

Also in various embodiments, a determination is made at step 514, based on the additional inputs, as to whether the auditory guidance task is complete. Similar to step 504 above, in various embodiments, the determination may be made by one or more processors (such as the processor 122 of FIG. 1) and the transducer control processing module 420 of FIG. 4.

In various embodiments, when it is determined at step 514 that the auditory guidance task is not yet complete, then the process returns to step 510, as the cancellation instructions continue to be provided for the transducers, and the process proceeds again to steps 512 and 514 in a new iteration. Conversely, in various embodiments, when it is determined in an iteration of step 514 that the auditory guidance task is complete, then the cancellation instructions are terminated (step 516) (e.g., by the processor 122 of FIG. 1 via the transducer control processing module 420 of FIG. 4), and the process ends at step 518.

Accordingly, in various embodiments, auditory guidance is provided for individual who are to move to a particular location, such as a portal (e.g., door) or path of a platform (such as a vehicle). The disclosed systems, methods, and platforms provide for potentially improved auditory guidance as needed for a particular location (e.g., when the individual has a vision impairment, and/or when fog, smoke, and/or other conditions may impact visibility of the desired location for the individual). Specifically, when an individual is on a desired plane or path (e.g., within a desired path or within a plane that is orthogonal to a desired portal), the individual will be able to continue along the desired plane or path by recognizing the reduced magnitude of the sound along the desired plane or path. In addition, even if the individual strays from the desired plane or path, the individual would then be redirected toward the desired plane or path as the sound would therefore increase in magnitude.

In various embodiments, the audio transducers 118 may be pre-set to be intentionally out of phase with one another, and the resulting phase cancellation zone between them may be utilized to communicate a path to the portal in order to provide the requested auditory guidance. For example, in certain embodiments, one audio transducer 118 in a pair may be pre-wired backwards from the other, resulting in a cancellation field that is perpendicular to the line between the transducers and in the portal. In other embodiments, the path of the null field may be accomplished and/or changed by a controller 120 that adjusts the phase of one of the pair of audio transducers 118, and/or via one or more techniques that would result in the desired phase cancellation, such as (i) a phase-shift circuit or algorithm as part of a more complex system; (ii) selecting from multiple speaker locations; (iii) pre-recorded phase shifted program material associated with a given phase shift angle, and the like. For example, in certain embodiments, this may be achieved through intentionally wiring transducers to be out of phase (therefore not requiring any additional signal processing—and effective with a mono signal through two transducers), optionally cross wiring the phase of input signals to a stereo amplifier to achieve the same result (and may be switched) or preparing out of phase stereo program material in advance. For example, in one such embodiment, a 'prepared in advance' application could be stereo, and in-phase human voice announcing "Please proceed to the doorway" followed by tones that include the out of phase invention (in certain embodiments, the announcement may also explain how to use 'guide tones', or the auditory guidance to reach the desired location or target).

Similar to the discussions above, in various embodiments, the disclosed systems, methods, and platforms may be utilized in connection with vehicles, including vehicle doors, as well as any number of other portals (e.g., building doors, hallways, bathrooms, drinking fountains, and so on). Also similar to the discussion above, in various embodiments, the auditory guidance request may be triggered automatically via one or more events (e.g., a door opening, or the like), and/or by a request by a nearby individual who requires assistance (e.g., as requested by the individual via his or her cell phone and/or other device).

Also in various embodiments, as discussed above, the transducers 118 provided the phase-based path may also provide auditory identification for convenience, safety, and/or emergency. For example, in certain embodiments, the disclosed methods, systems, and platforms may be applied to smoke alarms or building evacuation alarms (among other possible devices and/or systems). In certain such embodiments, the method, system, and/or platform may utilize a position of least annoyance due to sound, which for example could be tailored to be the path in which it is desired for nearby individuals to take. By way of further example, in another application of a take shelter alarms in a glass windowed building, the transducers 118 could be controlled so as to present one phase along one side and the cancelling phase on the other such that the "most comfortable" position with respect to alarm noise is in the shelter areas near the center of the structure, and so on in various embodiments.

In certain embodiments, the above-described auditory guidance may be accomplished through use of a signal processing controller, wiring transducers to be out-of-phase, recording stereo program material with out-of-phase elements, inverting the phase of one input on a stereo amplifier or mono amplifier set, or other mechanisms to achieve the out-of-phase signal end result, and/or in connection with one or more processors. Also in one embodiment, having stereo audio material prepared in advance may utilize both in phase verbal instruction and out-of-phase guide tones in the same program material. Also in one embodiment, the above-described techniques may be used in connection with any number of different types of vehicles and/or other platforms, such as an exit row of an aircraft that may be identified vis speakers arranged on either side of the row such that escaping passengers can perceive the phase cancellation to indicate the portal as they move parallel to the plane of the portal along the aisle (providing guidance to target utilizing an intersect of the guide path as opposed to following the length of the guide path), and/or any number of targets and/or other points of interest (such as an ATM, a water fountain, and so on). It will be appreciated that the systems, methods, and platforms may vary from those depicted in the Figures and described herein. It will similarly be appreciated that the steps of the method of FIG. 5 may differ, and/or be performed in a different order and/or simultaneously with one another, and/or that the implementations and illustrations of FIGS. 1-5 may vary from that depicted in FIGS. 1-5 and described in connection therewith, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   receiving information pertaining to a guidance task to provide auditory guidance proximate a location or target for a platform;
   selecting, via a processor, a plurality of transducers proximate the location or target, the plurality of transducers comprising:
      a first transducer disposed on a first side of the location or target; and
      a second transducer disposed on a second side of the location or target, opposite the first side; and
   controlling, via the processor, the plurality of transducers to provide auditory signals, such that the first transducer and the second transducer produce respective auditory signals that are phase cancelled with respect to one another, to thereby provide the auditory guidance to the location or target;
   wherein the step of controlling the plurality of transducers comprises controlling the plurality of transducers such that the auditory signals have relatively less magnitude in a plane that is orthogonal to the location or target, as compared with regions surrounding the location or target, such that an individual can follow the relatively less magnitude of the auditory signals along the plane to the location or target.

2. The method of claim 1, wherein the step of selecting the plurality of transducers comprises selecting the plurality of transducers such that the first transducer and the second transducer are disposed an equal distance from the location or target.

3. The method of claim 2, wherein the first transducer comprises a first loudspeaker, the second transducer comprises a second loudspeaker, and the step of controlling the plurality of transducers comprises controlling the first loudspeaker and the second loudspeaker such that respective sound waves of the first loudspeaker and the second loudspeaker are equal in magnitude, but with respective phases that are inverted relative to one another.

4. The method of claim 1, wherein the step of receiving information pertaining to the guidance task comprises receiving information pertaining to a person having a visual impairment who is to move to the location or target.

5. The method of claim 1, wherein:
   the step of receiving information pertaining to the guidance task comprises receiving inputs via a transceiver; and
   the method further comprises identifying the guidance task, via the processor, based on the inputs.

6. The method of claim 1, wherein:
   the step of receiving information pertaining to the guidance task comprises receiving information pertaining to auditorily guiding a person to a portal of the platform; and
   the step of selecting the plurality of transducers comprises selecting the plurality of transducers such that:
      the first transducer is disposed on a first side of the portal; and
      the second transducer is disposed on a second side of the portal, opposite the first side.

7. The method of claim 6, wherein:
   the step of receiving information comprises receiving information pertaining to auditorily guiding the person to a door of a vehicle; and
   the step of selecting the plurality of transducers comprises selecting the plurality of transducers such that:
      the first transducer is disposed on a first side of the door; and
      the second transducer is disposed on a second side of the door, opposite the first side.

8. The method of claim 1, wherein:
   the step of receiving information pertaining to the guidance task comprises receiving information pertaining to auditorily guiding a person to a path of the platform; and
   the step of selecting the plurality of transducers comprises selecting the plurality of transducers such that:
      the first transducer is disposed on a first side of the path; and
      the second transducer is disposed on a second side of the path, opposite the first side.

9. A system comprising:
   a first module configured to receive information as to a guidance task to provide auditory guidance proximate a location or target of a platform; and
   a second module configured to:
      select, via a processor, a plurality of transducers proximate the location or target, the plurality of transducers comprising:
         a first transducer disposed on a first side of the location or target; and
         a second transducer disposed on a second side of the location or target, opposite the first side; and
      control, via the processor, the plurality of transducers to provide auditory signals, such that the first transducer and the second transducer produce respective auditory signals that are phase cancelled with respect to one another, to thereby provide the auditory guidance to the location or target;

wherein the second module is configured to control the plurality of transducers such that the auditory signals have relatively less magnitude in a plane that is orthogonal to the location or target, as compared with regions surrounding the location or target, such that an individual can follow the relatively less magnitude of the auditory signals along the plane to the location or target.

10. The system of claim 9, wherein the second module is configured to select the plurality of transducers such that the first transducer and the second transducer are disposed an equal distance from the location or target side and positioned at a distance apart such that the phase cancellation line aligns with the intended target, portal or path.

11. The system of claim 9, wherein the first module is configured to receive information as to an individual having a visual impairment who is to move to the location or target.

12. The system of claim 9, wherein:
the guidance task pertains to auditorily guiding a person to a portal of the platform; and
the second module is configured to select the plurality of transducers such that:
  the first transducer is disposed on a first side of the portal; and
  the second transducer is disposed on a second side of the portal, opposite the first side.

13. The system of claim 12, wherein:
the platform comprises a vehicle; and
the portal comprises a door of the vehicle.

14. The system of claim 9, wherein:
the guidance task pertains to auditorily guiding a person to a path of the platform; and
the second module is configured to select the plurality of transducers such that:
  the first transducer is disposed on a first side of the path; and
  the second transducer is disposed on a second side of the path, opposite the first side.

15. A system comprising:
an input device configured to receive information as to a guidance task to provide auditory guidance proximate a location or target of a platform;
a plurality of transducers; and
a processor configured to:
  select a first transducer and a second transducer of the plurality of transducers, such that:
    the first transducer is disposed on a first side of the location or target; and
    the second transducer is disposed on a second side of the location or target, opposite the first side; and
  control the first transducer and the second transducer to provide auditory signals, such that the first transducer and the second transducer produce respective auditory signals that are phase cancelled with respect to one another, to thereby provide the auditory guidance to the location or target;
wherein the processor is configured to control the plurality of transducers such that the auditory signals have relatively less magnitude in a plane that is orthogonal to the location or target, as compared with regions surrounding the location or target, such that an individual can follow the relatively less magnitude of the auditory signals along the plane to the location or target.

16. The system of claim 15, wherein:
the platform comprises a vehicle; and
the system is configured for implementation in the vehicle.

17. The system of claim 16, wherein:
the vehicle includes a door; and
the input device comprises a transceiver that is configured to receive information as to an individual having a visual impairment who is to enter the vehicle through the door.

* * * * *